April 7, 1936.　　　　K. J. TOBIN　　　　2,036,991
DOOR CONSTRUCTION
Filed March 24, 1934　　　5 Sheets-Sheet 4
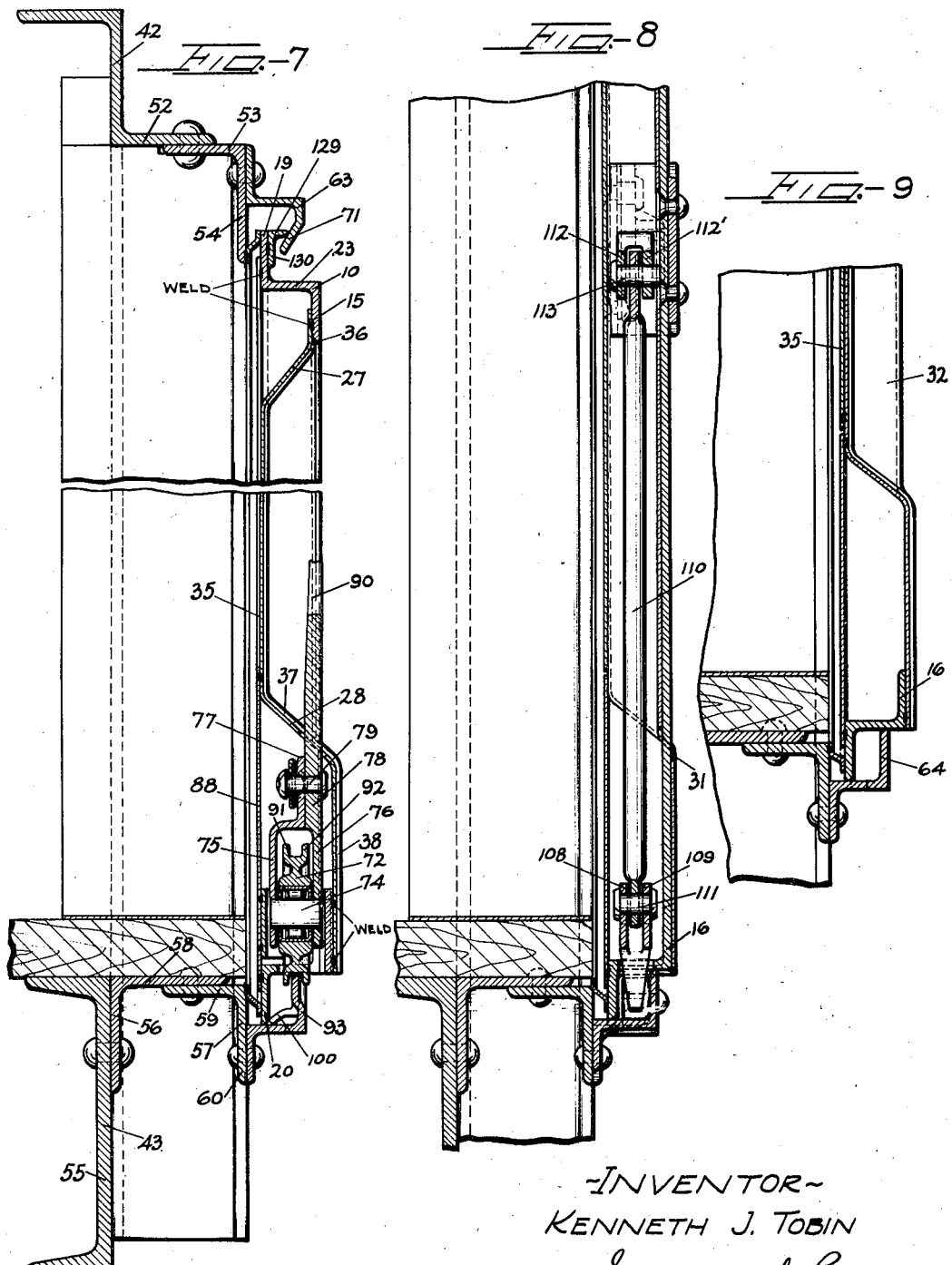
INVENTOR—
KENNETH J. TOBIN
By Samuel Reese
ATTY.

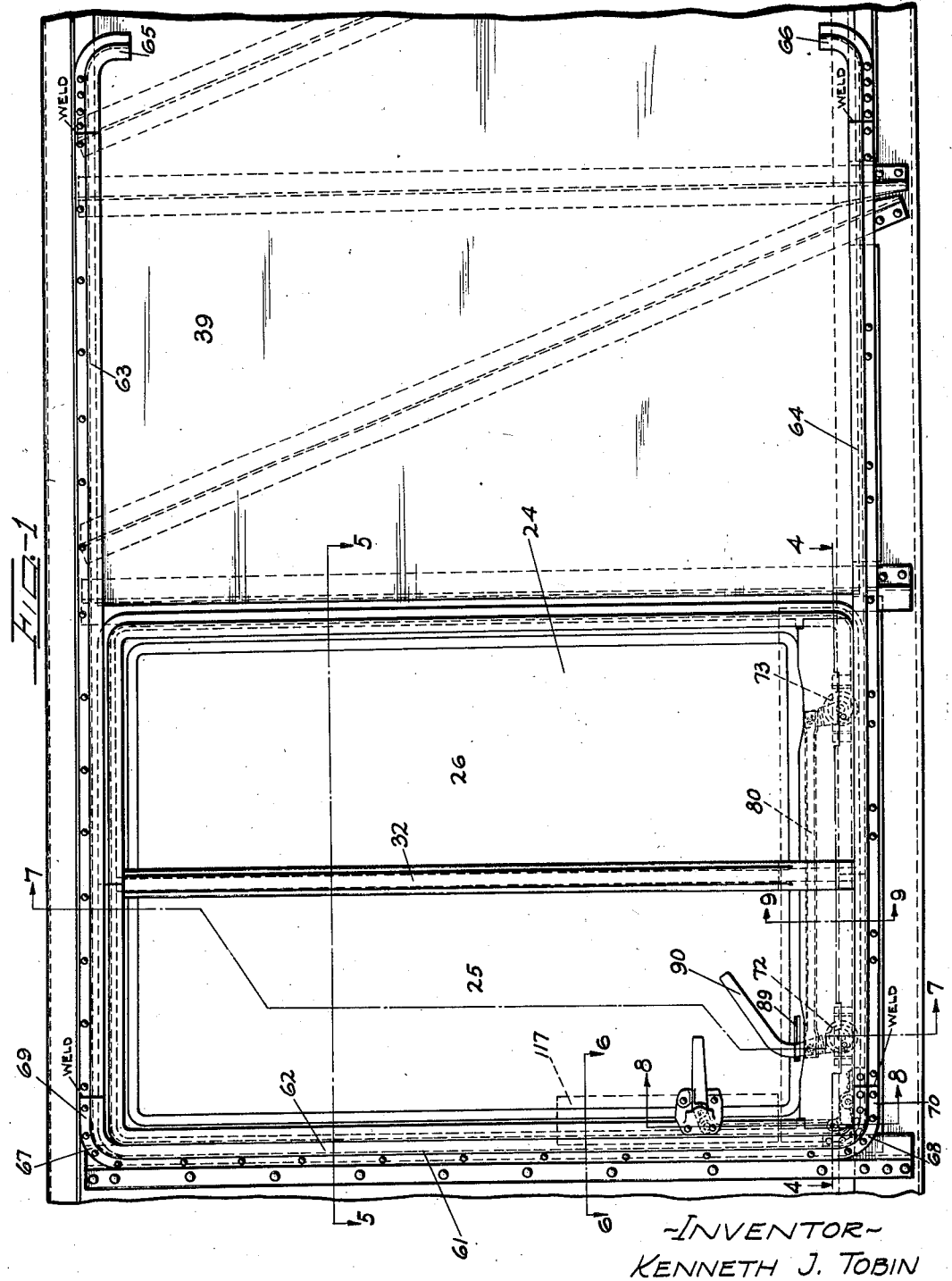

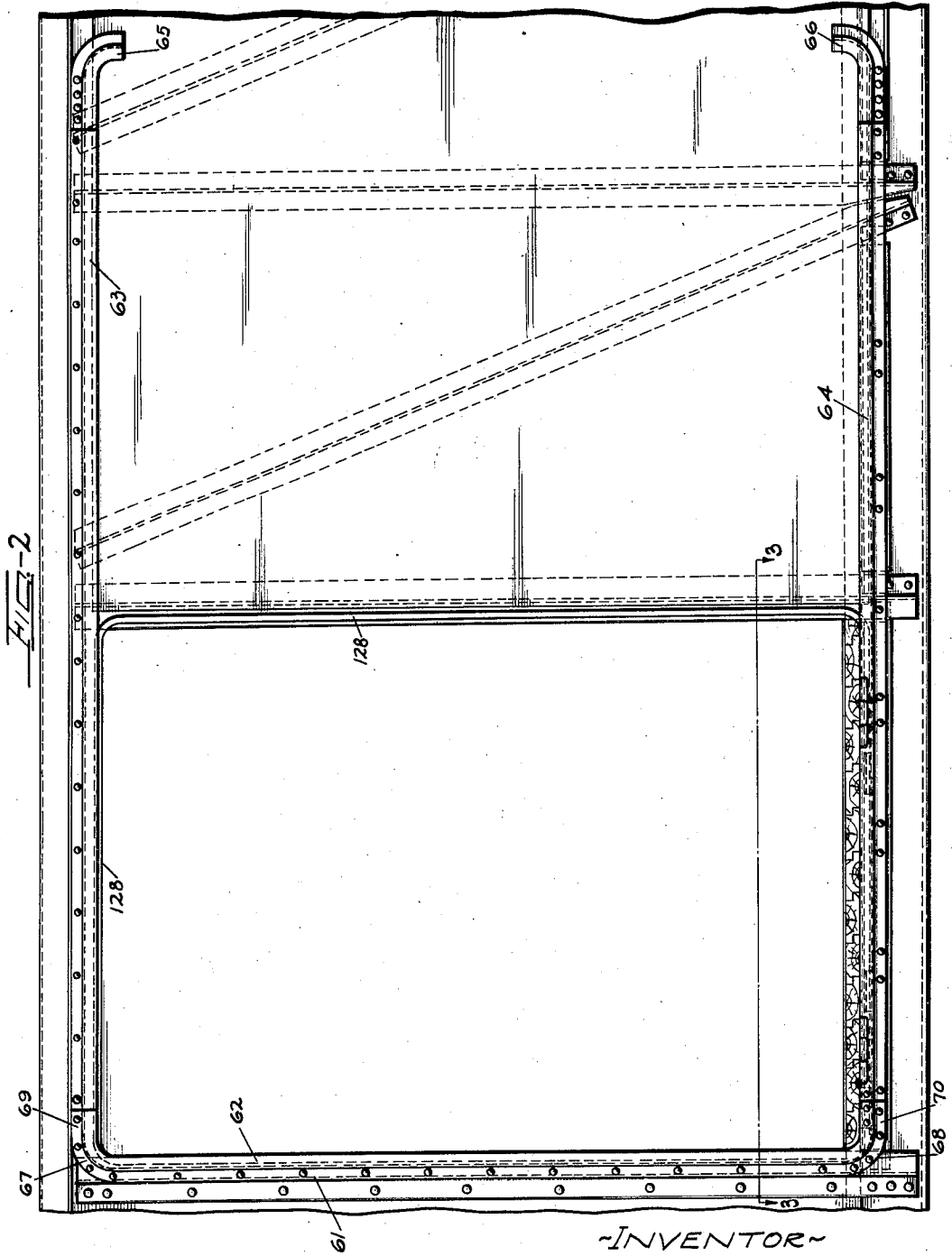

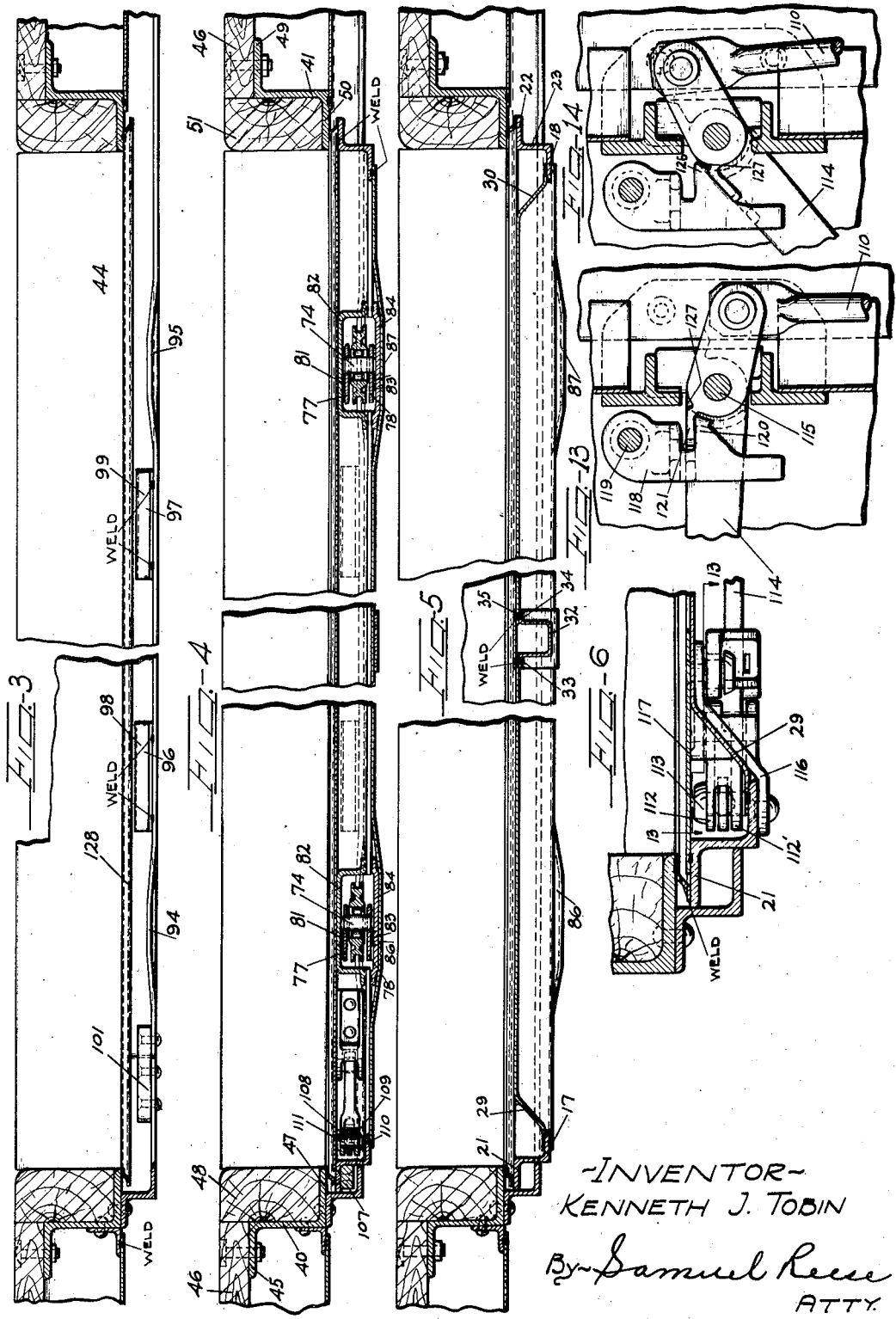

April 7, 1936. K. J. TOBIN 2,036,991
DOOR CONSTRUCTION
Filed March 24, 1934 5 Sheets-Sheet 5
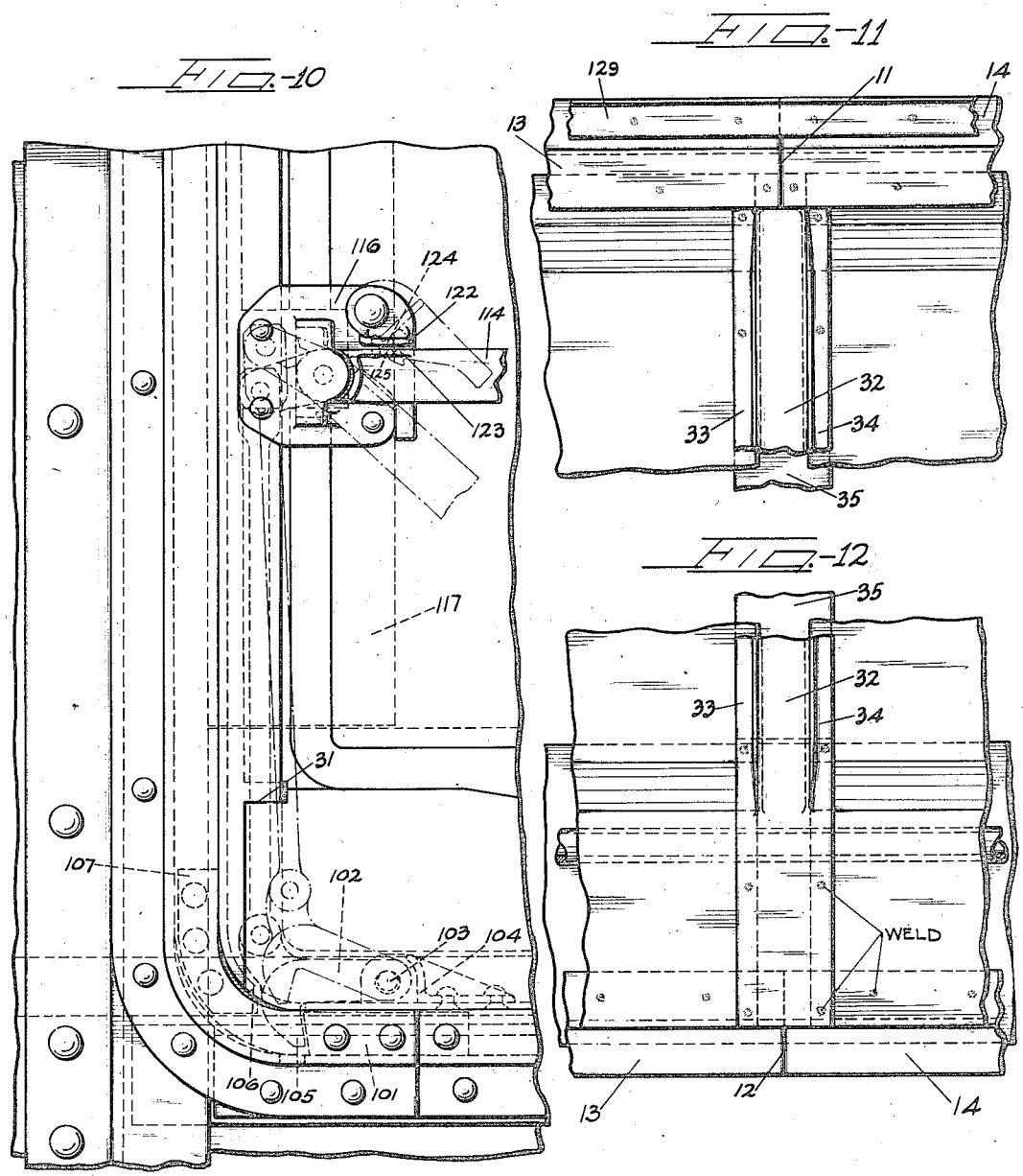
~INVENTOR~
KENNETH J. TOBIN
By~ Samuel Reese
ATTY.

Patented Apr. 7, 1936

2,036,991

UNITED STATES PATENT OFFICE 2,036,991

DOOR CONSTRUCTION

Kenneth J. Tobin, Chicago, Ill., assignor, by mesne assignments, to The Youngstown Steel Door Company, Cleveland, Ohio, a corporation of Ohio Application March 24, 1934, Serial No. 717,153

25 Claims. (Cl. 189—46)

This invention relates generally to railway house cars and is directed primarily to metallic sliding doors for such cars and to a frame construction for the doors carried by said cars.

The invention concerns itself, additionally, with a novel sealing arrangement and latching mechanism for said doors.

It is an object of this invention to provide a metallic door which shall be sturdier in construction, cheaper in cost and lighter in weight than the corrugated metallic doors now in general use.

A further object is to provide an all-welded door capable of rapid and commercial fabrication.

A further object is to provide an all-welded door designed so as to be capable of being welded on welding machines of the normal throat dimension.

A further object is to provide a strong metallic door so constructed as to completely house supporting, lifting and latching mechanism with the exception of the actuating levers, thereby effecting a decrease in the projection of the door from the car side and the attainment of a car of increased width.

A further object is to provide a welded door having a single vertical joint reinforced by a continuous member serving to resist strains from lading tending to bulge the door outwardly.

A further object is to provide a welded door comprising panels arranged to form a vertical joint and a reinforcing member for said joint, the reinforcing member being welded to a single thickness of each of the panels.

A further object is to provide a car framing construction for sliding car doors, said framing construction incorporating in a unitary member a track, front stop, top retainer and back stops for said door.

A further object is to provide a car framing member for sliding car doors including a vertical front stop having integral rounded horizontal portions disposed respectively above and below a door opening in the car side and integral horizontal branches similarly disposed to provide a rigid reinforcing frame for the car adjacent to the door opening.

A further object is to provide a car framing member for sliding car doors including a vertical front stop having integral rounded horizontal portions disposed respectively above and below a door opening provided in the car side, thereby providing a weather tight condition at the upper front corner of such sliding door.

A further object is to provide a novel seal for an outside sliding car door.

A further object is to provide a seal for an outside sliding car door which shall effect a reduction in the extension of the door from the car, thereby permitting attainment of a wider car.

A further object is to provide a novel latching and closing arrangement for sliding car doors.

Other objects will become clear as the description of the invention proceeds.

In the drawings forming part of this specification Figure 1 is a partial elevation of a railway house car embodying the invention;

Figure 2 is a view similar to Figure 1, the door being removed to more clearly illustrate the frame and seal construction;

Figure 3 is a horizontal section taken on line 3—3 of Figure 2;

Figure 4 is a horizontal section taken on line 4—4 of Figure 1;

Figure 5 is a horizontal section taken on line 5—5 of Figure 1;

Figure 6 is a horizontal section taken on line 6—6 of Figure 1;

Figure 7 is a vertical section taken on line 7—7 of Figure 1;

Figure 8 is a vertical section taken on line 8—8 of Figure 1;

Figure 9 is a vertical section taken on line 9—9 of Figure 1;

Figure 10 is an enlarged fragmentary elevational detail of a part of the car, showing the lower left hand portion of the door, frame and latching and closing mechanism;

Figure 11 is an enlarged fragmentary detail of the upper part of the door, including the vertical joint;

Figure 12 is an enlarged fragmentary detail of the lower part of the door including the vertical joint;

Figure 13 is a horizontal section taken on line 13—13 of Figure 6; and

Figure 14 is a view similar to Figure 13, showing the relationship between the sealing pin and latch lever in the disengaged position of the latch.

Referring to the drawings applicant's novel door is illustrated in elevation in Figure 1, sections thereof being shown in Figures 4 to 6, inclusive, and 7 to 12, inclusive. As clearly appears from these figures of the drawings the door comprises an integral unitary frame designated as a whole by the numeral 10 and which may be constituted of two generally U shaped sections welded together along the vertical center line of the door as indicated at 11 and 12 in Figures 11 and 12, respectively. The unitary frame, as clearly illustrated in Figure 1 of the drawings, is preferably provided with rounded corners in order to impart rigidity thereto and to the complete door. The frame as appears from the sectional views referred to above is preferably formed of structural members 13 and 14 which are Z shaped in section. These structural members are arranged in the frame so as to provide upper and lower inwardly directed flanges 15 and 16 and vertical inwardly directed flanges 17 and 18. The frame additionally presents upper and lower outwardly directed flanges 19 and 20 and vertical outwardly directed flanges 21 and 22. Between these flanges the web 23 extends laterally at right angles to said flanges. It is to be understood, however, that the unitary frame above described may be formed of a single Z shaped section, the ends of which may be welded together.

To the unitary marginal reinforcing frame above described a door panel 24 is welded. This panel preferably is formed of a plurality of vertically extending sheet metal sections 25 and 26, the marginal portions of which are laterally offset as indicated at 27, 28, 29 and 30. These offset portions are welded to the corresponding inwardly directed flanges 15, 16, 17 and 18 of the marginal reinforcing frame 10. As clearly appears from Figures 5, 8 and 10 of the drawings the laterally offset margins 27 and the main portion of the laterally offset margins 29 and 30 are disposed upon the inside of the corresponding inwardly directed flanges of the marginal reinforcing frame. The laterally offset marginal portion 28 of the panel is disposed upon the outside of the inwardly directed flange 16 of the marginal frame and upon the outside of the lower portions of the inwardly directed flanges 17 and 18 of said frame. To this end the remote vertical margins of the metallic panel 24 are recessed as indicated at 31 so that the lower portion of said panel may readily be disposed in the manner hereinabove described.

The adjacent vertical edges of the panel sections 25 and 26 are secured together and reinforced by means of a substantially channel shaped reinforcing member 32, disposed upon the outside of said sections and provided preferably with laterally extending flanges 33 and 34. A reinforcing plate 35 is secured upon the inside of the sheet metal sections 25 and 26 across the vertical joint formed between said sections. The channel shaped reinforcing member and the reinforcing plate are secured to the adjacent margins of the sheet metal sections, preferably by means of spot welding the flanges 33 and 34, the marginal portions of the panel sections and the reinforcing plate together. As clearly shown in Figure 5 of the drawings the welding occurs preferably through a single thickness of each of the panel sections. By means of the arrangement of the reinforcing members it will be apparent that a certain amount of flexibility in the width of the door is provided inasmuch as the adjacent edges of the panel sections may be moved toward each other in the event that a narrower door is desired. The substantially channel shaped reinforcing member 32 extends upwardly preferably into abutting engagement with the inwardly directed flange 15 of the marginal reinforcing frame as indicated at 36. The channel shaped portion of the reinforcing member continues downwardly to the offset 28 provided in the lower portion of the panel as indicated at 37. From this portion the reinforcing member 32 continues downwardly as a plane sheet 38 in overlapping relationship with the adjacent vertical edges of the panel sections 25 and 26. It will be apparent from the foregoing description that there is thus provided a sturdy, light weight door which, by virtue of its marginal reinforcing frame, will remain true. The points at which connections are made between the panel and the marginal frame and between the panel and the reinforcing members are readily available for welding so that said door may be fabricated as a completely welded door by available commercial welders.

The door hereinabove described is adapted to be mounted for sliding movement upon a railway house car 39 which briefly embodies front and rear door posts 40 and 41, a side plate 42 and a sill 43. The parts just referred to define a door opening 44 adapted to be closed by the door 24. The front door post 40, which is of substantially Z shaped construction, has an outwardly directed flange 45 to which the inner lining 46 of the car is secured. The front post 40 is also provided with an inwardly directed flange 47 and carries a wooden filler strip 48. The rear door post 41 is provided with an outwardly directed flange 49 and an inwardly directed flange 50. The inner lining 46 is secured to the outwardly directed flange 49. A wooden filler member 51 is carried by the rear door post 41. The substantially Z shaped side plate 42 has secured to the laterally extending flange 52 thereof an angle member 53 presenting an inwardly directed flange 54. The side sill 43 to the extent of the travel of the door embodies, in addition to the channel shaped structural member 55, a plurality of angle members 56 and 57, the horizontally disposed legs 58 and 59 of which are secured together so as to position the leg 60 of the angle 57 outwardly below the door opening.

To the end that the door 24 may be slidably mounted upon the car 39 applicant's novel door frame, indicated in its entirety by reference numeral 61, is provided. The frame is constituted as an integral unitary member which is preferably comprised of the vertically disposed portion 62, upper and lower horizontal branches 63 and 64 and upper and lower end pieces 65 and 66. The vertical portion of the car door frame 61 is bent so as to provide the upper and lower rounded corners 67 and 68 and the relatively short horizontal portions 69 and 70. The branches 63 and 64 are preferably welded to the portions 69 and 70 while the end portions 65 and 66 are preferably welded to the opposite ends of the branches 63 and 64, thus providing an integral unitary car door frame. The frame is preferably Z shaped in section and a structural Z shaped member is, consequently, used in its construction. This structural Z shaped member is of the same dimensions as the Z shaped member utilized in the production of the marginal reinforcing frame of the door, thus introducing a decided economy into the construction of a door and the car frame therefor. The vertical portion 62 of the frame 61 is secured to the inwardly directed flange 47 of the front door post. The upper horizontal branch 63 of said frame is secured to the inwardly directed flange 54. The lower horizontal branch 64 of said frame is secured to the side sill 43. By virtue of its construction and its disposition upon the car side it will be apparent that the frame serves to maintain the integrity of the door opening so that it will not be distorted due to the weaving and racking of the car in transit and aids in reinforcing the side plate and side sill of the car. The vertical portion 62 of said frame serves as a front stop for the door 24, as clearly indicated in Figures 4 and 5 of the drawings. The upper branch 63 of the frame constitutes a retaining bar for the upper margin of the door, as clearly indicated in Figure 7 of the drawings. The lower branch 64 of the frame is utilized as a track for the door while the end portions 65 and 66 of said frame are bent, respectively, downwardly and upwardly so as to constitute back stops for said door. It will be clear from Figure 7 of the drawings that the inwardly directed flange of the upper branch 63 of the frame across the door opening is bent inwardly and downwardly as indicated at 71. It is to be observed that by virtue of the rounded corners 67 and 68 of the car door frame 61 a weather tight condition is provided for the upper and lower forward corners of the door, while obviating the usual gusset and casting heretofore utilized at such corners for this purpose.

The door is preferably of the type known as a lift door. Said door is, consequently, provided with lifting and supporting mechanism. Such mechanism may comprise a plurality of spaced rollers 72 and 73, these rollers being mounted upon pins such as indicated at 74 fastened in the flanges 75 and 76 provided on the members 77 and 78. These members are secured together as by means of rivets 79, said rivets being utilized for the connection of a bar 80 by means of which simultaneous operation of the lift mechanism is effected. Each of the members 77 is provided with a trunnion 81 journaled, as illustrated in Figure 4 of the drawings, in a reinforcing member 82 secured to the inwardly directed flange 16 and extending across a cope provided in said flange in order to permit the extension of the rollers 72 and 73 below the marginal reinforcing door frame. Each of the members 78 is provided with a trunnion 83 journaled in the reinforcing member 84 secured to said inwardly extending flange 16 across the copes provided therein. The trunnions 81 and 83, as clearly shown in Figure 4 of the drawings, are disposed in offset relationship to the pins 74. It will be evident from Figures 4 and 7 of the drawings that the hereinabove described lifting and supporting mechanism is disposed within the lower offset portion of the door so as to be protected thereby and that the panel is bowed outwardly as indicated at 86 and 87 in order to accommodate the rollers and their cooperating parts. The lifting and supporting mechanism is protected against possible injury by shifting of the lading within the car by means of a backing plate 88, the vertical extent of which is defined by the plate reinforcing member 35. In order to operate the supporting and lifting mechanism one of the members 78 is extended upwardly through an opening 89 provided in the offset 28 of the door panel so as to constitute an operating lever 90. The rollers 72 and 73 are flanged as indicated at 91 and 92 inasmuch as the inwardly directed vertically disposed flange 93 of the lower branch 64 of the car door frame is utilized as a tread for said rollers.

The flange 93 is provided with inwardly directed indentures 94 and 95. In addition, the lower branch 64 of the car door frame carries angle members 96 and 97 arranged to present flanges 98 and 99 directed toward the car side. Each of these flanges, as clearly indicated in Figure 7 of the drawings, is inclined downwardly as indicated at 100. An abutment member 101 is secured to the portion 70 and to the lower branch 64 for a purpose which will hereinafter appear.

Mechanism is provided for locking the door in its closed position, this mechanism being of such construction as to avoid extension across the front vertical margin of the door. There is provided, consequently, a hook shaped latch 102, one end of which is loosely and pivotally mounted upon a pin 103 carried by a bracket 104 secured to the web 23 at the lower portion of the door. The nose 105 of the latch 102 is adapted to extend below this portion of the marginal reinforcing door frame and for this purpose the web 23 of said frame is coped as indicated at 106. The web 23 adjacent the cope provided therein is preferably reinforced by means of a metallic member 107. As clearly illustrated in Figures 4 and 8, the latch member 102 is provided with a pair of spaced ears 108 and 109 between which the lower end of an actuating bar 110 is pivotally secured as by means of a rivet 111. The latch 102, with the exception of the nose portion thereof which projects through the cope 106 formed in the marginal reinforcing door frame, lies within the laterally offset lower portion of the door panel. Similarly, the actuating bar 110 is disposed within the laterally offset front vertical margin of the door panel whereby protection is afforded these members and the projection thereof laterally beyond the door is eliminated. The upper end of the actuating rod 110 is pivotally secured between the spaced ears 112 and 112' by means of a rivet 113 to one end of an actuating lever 114. Said connected end of the actuating lever projects through the offset 29 provided in the front vertical margin of the door panel and is pivotally supported as indicated at 115 upon a bracket 116 fastened to the door 24 and following the contour of the laterally offset front vertical margin. In order to close the opening thus provided in the front vertical margin of the door a plate 117 is secured to the panel section 25 and the outwardly directed flange 21 of the marginal door reinforcing frame.

A sealing pin 118 is utilized in connection with the actuating lever 114, this pin being preferably swingably mounted upon the door panel as indicated at 119. In the engaged or home position of the hook shaped catch 102 the actuating lever 114 is disposed in a substantially horizontal position as indicated in Figure 13 of the drawings. The actuating lever is maintained in this position by means of the engagement between a shoulder 120 provided on the sealing pin and a shoulder 121 formed on the actuating lever. Additionally, shoulders 122 and 123 are provided, respectively, on the sealing pin and on the actuating lever, these shoulders having alined openings 124 and 125 adapted to receive a seal. It is apparent from this construction that unauthorized movement of the actuating lever downwardly in order to release the catch member 102 is obviated.

As clearly indicated in Figures 13 and 14 of the drawings, the shoulder 120 of the sealing pin 118 is formed with a hook shaped end 126, which is adapted to engage a recess 127 formed in the upper edge of the actuating lever 114 when said lever has been operated in order to release the hook shaped catch member 102 from its operative engagement with the abutment 101. As a result of this engagement which occurs automatically upon operation of the lever 114, it will be apparent that the catch member 102 will be maintained in its released or retracted position until the sealing pin is released from the actuating lever.

A novel and effective sealing arrangement for the door in its closed position is provided by applicant's invention. For this purpose there is secured to the front and rear door posts 40 and 41, the flange 54 of the angle member 53 and the flange 60 of the angle member 57 a continuous flexible metallic sealing strip 128. It will be apparent from Figures 2, 3, 4 and 7 that the sealing strip 128 extends continuously around the door opening. The sealing strip 128 is preferably formed as a unit which is subsequently applied as by means of welding to the portions of the car above set forth. By this construction it is apparent that a sealing strip of uniform section in all of its parts may be utilized. The door is adapted to engage laterally against the sealing strip in order to effectively exclude the weather from the car. As a consequence of the construction of the sealing strip and the structure of the door which presents an inner face lying substantially in a single plane said lateral engagement between the door and the sealing strip may be had. The said constructions of the sealing strip and the door, moreover, eliminate the usual lateral projection of the front and rear posts, eliminate a substantial portion of the projection of the customary guard strip secured to the rear door post and, also, eliminate the inward lateral projection of the sealing strip customarily provided upon the inner face of the door adjacent the rear vertical margin thereof. As a consequence of these results it is apparent that the lateral projection of the door from the car side may further be decreased so as to make possible the attainment of a wider car within the prescribed tunnel clearances.

From its closed position illustrated in Figure 1 of the drawings the door may readily be moved to its open position. For this purpose the actuating lever 114 of the latching mechanism may be grasped and pulled downwardly after the seal (not shown) has been removed and the sealing pin swung out of the path of movement of the actuating lever. This operation of the actuating lever through the actuating bar 110 will effect release or disengagement of the hook shaped member 102 from its abutment 101. As the sealing pin has been released for actuation of the lever 114 the hook shaped portion 126 of said pin will automatically engage in the recess 127 of the actuating lever in order to maintain said lever in its down position and the hook shaped member 102 in its released position for a purpose which will hereinafter be set forth. The door is now released from all engagement with the car and the operating lever 90 of the lift mechanism may then be pulled downwardly, as a result of which the door is elevated through the medium of the trunnions 81 and 83, which move upwardly about the rollers 72 and 73 as fulcrums. The door which, prior to the actuation of the lift mechanism, was disposed in frictional engagement with the track portion of the car door frame is now released from such frictional engagement and is supported upon the antifriction rollers. When thus supported the door may readily be moved to its open position, such opening movement being limited by the end portions 65 and 66 of the car door frame which serve as stops for this purpose.

Upon the return of the door to its closed position the door will move freely upon the supporting rollers 72 and 73. Adjacent its closed position the door will automatically be moved laterally toward the car side and the sealing strip 128 by the indentures 94 and 95 provided in the tread 93 of the car door frame. During this movement of the door toward closed position it will be apparent that the hook shaped catch member 102 of the latching mechanism will clear the angle members 96 and 97 carried by the lower horizontal portion of the car door frame as well as the abutment 101 carried thereby inasmuch as said catch member is maintained in its released position by the sealing pin as hereinabove described. There is thus avoided the possibility of rapid upward swinging movement or whipping of the actuating lever 114, which might otherwise occur if the rounded nose 105 of the catch member 102 were to strike either the angle shaped member 96 and 97 or the abutment 101 and force the free end of the catch member to swing upwardly about its pivot. The operating lever 90 of the lift mechanism is then released whereupon the door, by the action of gravity, will automatically be lowered so as to again establish frictional engagement between the bottom of the door and the lower portion of the car door frame. During this downward movement of the door the outwardly directed flange 20 at the bottom thereof will engage the inclined flanges 98 and 99 of the angle members 96 and 97, thereby also forcing the door laterally into engagement with the flexible sealing strip 128. By virtue of the character of the sealing strip employed it will be evident that the binding which frequently occurs between the front vertical margin of the usual door and the front stop angle therefor and the binding which frequently occurs between the car guard strip and door sealing strip usually employed at the rear vertical margin of the door is entirely avoided. A further consequence resulting from the character of the sealing strip employed may be found in the intimate engagement between the upper margin of the door, the sealing strip and the inclined flange 71 provided on the upper horizontal portion of the car door frame. As clearly shown in Figure 7 of the drawings intimate engagement is obtained between the upper margin of the door and the flexible sealing strip. In addition, intimate engagement is obtained between the horizontal flange 129 of the reinforcing member 130 preferably welded to the outwardly directed flange 19 of the marginal reinforcing door frame and extending across the joint formed in said frame. The intimate engagement above described may be had while at the same time insuring frictional engagement between the lower portion of the door and the supporting track. This follows from the fact that as the door is biased to its lowered position by the action of gravity the flexible sealing strip will yield so as to permit the door to move downwardly and permit intimate contact between the flange 129 and the inclined flange 71. Without the employment of the flexible sealing strip such intimate engagement could not be had because of the possibility that the door would be hung from its upper margin, thus preventing frictional engagement between the lower portion of the door and the track.

Referring to that portion of the flexible sealing strip which is secured to the car below the door opening, as shown in Figure 7 of the drawings, it will be evident that there is provided, by means of its construction, a baffle for preventing ingress of the elements into the car as customarily occurs with present door constructions.

When the door has thus been returned to its closed position the sealing pin may be released from the actuating lever 114, whereby the hook shaped catch 102 may be moved to latching engagement with its abutment 101. The relationship between the actuating lever 114 and the sealing pin 118, as clearly shown in Figure 13 of the drawings, may then be restored and a seal inserted through the lever and the pin. It will be apparent that by virtue of the latching mechanism illustrated and described the usual hasp latching mechanism which requires extension across the forward vertical margin of the door and securement to a lock plate member fastened to the car is avoided. It will also be manifest from Figure 10 of the drawings that the latching mechanism described may also function in order to exert a closing movement upon the door in the event that the ordinary movement of the door upon the rollers does not fully close the door. The pivot point 103 of the hook shaped catch member 102 lies in a plane above the nose 105 of the catch member. Consequently, as the catch member is swung upwardly the nose portion will have a horizontal component of movement toward the left away from the abutment 101, as clearly shown in Figure 10 of the drawings. Therefore, if the door is brought in its closing movement to such position that engagement between the nose portion and the upper left hand edge of the abutment member may be had it will be apparent that upward swinging movement of the actuating lever 114 will cause a downward movement of the catch member 102 which, in turn, will exert a force upon the abutment 101 so as to force the door in the direction of closing movement. In the engaged position between the catch member 102 and its abutment 101 the nose of the catch member will extend through the cope 106 provided in the marginal door reinforcing frame. As clearly shown in Figure 10 of the drawings, the catch member 102 is loosely pivotally mounted upon the bracket 104. By virtue of this construction it is apparent that the pivotal mounting of the catch member is relieved of all strain in the event the door tends to move toward open position. This will be apparent from a consideration of the fact that should the door move toward open position that portion of the door adjacent the cope in the marginal door reinforcing frame will come into contact with the nose of the catch member while said nose will contact the abutment 101. The catch member will then be pinched between the door and the abutment, thereby relieving the pivotal mounting of the catch member of all strain.

It will be apparent that numerous changes and modifications in the details of the invention will be clear to those skilled in the art. It is intended, therefore, that all such modifications and changes be comprehended within this invention, which is to be limited only by the scope of the claims appended hereto.

I claim:

1. An all welded metallic door adapted to be slidably mounted upon a railway house car side, comprising a continuous relatively sturdy marginal frame, a plurality of vertically extending sheet metal panel sections and a member upon the outside of said sections overlapping the vertical joint between said sections for joining said sections together, said marginal frame and said member being welded to said sections, said member being welded to a single thickness of said sections.

2. An all welded metallic door adapted to be slidably mounted upon a railway house car side, comprising a continuous pre-constructed relatively sturdy marginal frame having rounded corners, a plurality of vertically extending sheet metal panel sections, a reinforcing member upon the outside of said sections overlapping the vertical joint between said sections and a reinforcing member upon the inside of said sections overlapping said vertical joint, said marginal frame and reinforcing members being welded to said panel sections.

3. An all welded metallic door adapted to be slidably mounted upon a railway house car side, comprising a continuous relatively sturdy marginal frame having inwardly directed flanges, a pluraltiy of vertically extending sheet metal panel sections, the upper margin and the major portion of the vertical margins of each of said sections being overlapped by corresponding inwardly directed flanges of said frame, the lower horizontal margin of said sections being bent laterally and then downwardly and disposed in overlapping engagement with the lower inwardly directed flange and the adjacent portions of the vertical inwardly directed flanges of said frame, a reinforcing member upon the outside of said sections overlapping the vertical joint between said sections and conforming to the contour of the lower margin of said sections, said inwardly directed flanges and said reinforcing member being welded to said sections.

4. An all welded metallic door adapted to be slidably mounted upon a railway house car side, comprising a continuous relatively sturdy marginal frame and a panel formed of vertically extending sheet metal sections, said frame in the main overlapping said panel, the lower portion of said panel being offset laterally and provided with marginal recesses whereby said lower portion is adapted to overlap said frame, a reinforcing member upon the outside of said panel overlapping the adjacent edges of said sections, said frame and said reinforcing member being welded to said panel.

5. A metallic car door adapted to be slidably mounted upon a railway house car side, comprising a marginal relatively sturdy frame and a metallic panel, said panel having its forward vertical and lower margins laterally offset, latching mechanism for said door disposed in said offset portions, said mechanism comprising an actuating lever extending through an aperture provided in said vertical offset margin to the outside of said panel and a backing plate secured to said frame and said panel for closing said aperture.

6. A metallic lift door adapted to be slidably mounted upon a railway car side comprising a marginal relatively sturdy frame having angularly related flanges and a metallic panel, said panel having its lower portion bent laterally and then downwardly, lift mechanism disposed in the offset provided by said lower panel portion, said mechanism comprising an operating lever, said lever extending through an opening formed in said laterally bent portion to the outside of said panel and a backing plate secured to said frame and panel for closing said offset.

7. In a metallic car door adapted to be slidably mounted upon a railway house car side, a marginal relatively sturdy frame, substantially Z shaped in section, the flanges of said frame being disposed respectively inwardly and outwardly relative to said door, said frame being formed of two integral U shaped portions welded together along the vertical center line of said frame and an angular reinforcing member welded to the upper outwardly disposed flange of said frame, said reinforcing member extending across a joint between said U shaped sections.

8. In a metallic car door adapted to be slidably mounted upon a railway house car side, a marginal relatively sturdy frame, substantially Z shaped in section, the flanges of said frame being disposed respectively inwardly and outwardly relative to said door, said frame being formed of two integral U shaped portions welded together along the vertical center line of said frame and an angular reinforcing member welded to the upper outwardly disposed flange of said frame, said reinforcing member extending across a joint between said U shaped sections, and a metallic panel, said panel being laterally offset to provide margins welded to said inwardly disposed flanges of the frame, said panel comprising a plurality of vertically extending sheet metal sections, a reinforcing member welded to said sections in overlapping relationship with the adjacent vertical edges thereof, the upper edge of said reinforcing member abutting the edge of the upper inwardly disposed flange of said frame.

9. In a metallic car door adapted to be slidably mounted upon a railway house car side, a marginal relatively sturdy frame substantially Z shaped in section, the flanges of said frame being disposed respectively inwardly and outwardly relative to said door, a metallic panel, said panel being laterally offset to provide margins welded to said inwardly disposed flanges of the frame, said panel comprising a plurality of vertically extending sheet metal sections and a reinforcing member spanning the adjacent vertical edges of said sections and welded thereto, said reinforcing member being substantially channel shaped in section between the upper and lower offset portions of said panel and being substantially plane from said lower offset portion of said panel, said plane portion overlapping the lower margin of said panel.

10. A unitary car side framing member for a sliding car door, said framing member being U shaped and comprising a vertical portion secured to said car adjacent to the front vertical edge of a door opening formed in the car side and horizontal branches disposed respectively above and below said door opening in proximity thereto, said vertical portion providing a front stop for said door and said horizontal branches providing respectively a top retaining bar and a supporting track for said door.

11. An integral car side framing member for a sliding car door, said framing member comprising a vertical portion secured to said car adjacent to the front vertical edge of a door opening formed in the car side and horizontal branches disposed respectively above and below said door opening in proximity thereto, said vertical portion providing a front stop for said door and said horizontal branches providing respectively a top retaining bar and a supporting track for said door, said vertical portion and said branches being connected by integral rounded corners, whereby a weather tight condition is provided for the contiguous upper and lower corners of said door.

12. An integral car side framing member for a sliding car door, said framing member comprising a vertical portion secured to said car adjacent to the front vertical edge of a door opening formed in the car side and horizontal branches disposed respectively above and below said door opening in proximity thereto, said vertical portion providing a front stop for said door and said horizontal branches providing respectively a top retaining bar and a supporting track for said door, the ends of said horizontal branches being bent toward each other to provide back stops for said door.

13. A unitary car side framing member for a sliding car door, said framing member being U shaped and comprising a vertical portion secured to said car adjacent to the front vertical edge of a door opening formed in the car side and horizontal branches disposed respectively above and below said door opening in proximity thereto, said framing member being substantially Z shaped in section having outwardly directed flanges secured to the car and laterally offset inwardly directed flanges, said vertical portion serving as a front stop for said door and the inwardly directed flanges of said horizontal branches providing respectively retaining and tread means for said door.

14. A metallic car door adapted to be slidably mounted upon a railway car side, comprising a marginal relatively sturdy frame substantially Z shaped in section and a metallic panel, said frame being arranged with its web extending at right angles to said car side and its flanges directed respectively outwardly and inwardly, said panel having its forward vertical and lower margins laterally offset and secured to corresponding inwardly directed flanges of said frame, latching mechanism for said door disposed in said laterally offset portions, said mechanism comprising a latch device pivotally mounted upon the web at the lower portion of said frame, said web being coped to permit extension of said device through said web and means for actuating said device.

15. A metallic car door adapted to be slidably mounted upon a railway car side, comprising a marginal relatively sturdy frame substantially Z shaped in section and a metallic panel, said frame being arranged with its web extending at right angles to said car side and its flanges directed respectively outwardly and inwardly, said panel having its forward vertical and lower margins laterally offset and secured to corresponding inwardly directed flanges of said frame, latching mechanism for said door disposed in said laterally offset portions, said mechanism comprising a latch device loosely pivotally mounted upon the web at the lower portion of said frame, said web being coped to permit extension of said device through said web and means for actuating said device, an abutment carried by said car side and adapted to be engaged by said latch device to fasten said door in closed position, said latch device being pinched between the web of said door frame and said abutment to prevent tendency of said door to move toward open position for the purpose set forth.

16. A metallic car door adapted to be slidably mounted upon a railway car side, comprising a sheet metal panel and a metallic marginal frame, means provided on said door adapted to serve as an abutment, latching mechanism for said door comprising a loosely pivotally mounted latch device and actuating means therefor, an abutment secured to said car side engageable by said latch device to fasten said door in closed position, said device being disposed between said door means and said car abutment in the closed position of said door whereby displacement of said door in the direction of opening movement is prevented and the application of strain to the pivotal mounting of said latch device is avoided.

17. In a railway car having a door opening in a side thereof, a flexible sealing strip and a retainer bar having a lateral and downwardly directed flange disposed in offset relationship to said sealing strip secured to said car side above said door opening, a lift door slidably mounted upon said car side, the upper margin of said door being disposed between said sealing strip and said retainer flange, said door being automatically lowered as the door reaches its closed position, the upper margin of said door engaging said retainer flange and being directed into intimate engagement with said flexible sealing strip by the lowering movement of said door, said flange and said door margin having contacting engagement in the lowered position of said door.

18. In a railway car having a door opening in a side thereof and a track below said door opening, a flexible sealing strip secured to said car below and adjacent to said door opening, a door slidably supported upon said track, means for forcing said door laterally into intimate engagement with said sealing strip as the door approaches closed position, said sealing strip having a flange extending laterally from said car and forming a baffle for the purpose set forth.

19. In a railway house car having a door opening, a metallic door having a panel and a marginal reinforcing frame, the inner face of said door lying substantially in a single plane, said door being free of projections inwardly of said plane, and a flexible metallic sealing strip secured to said car around said door opening, the marginal portions of said door having lateral engagement with said sealing strip in the closed position of said door.

20. In a railway house car having a door opening, a metallic door having a panel and a marginal reinforcing frame, the inner face of said door lying substantially in a single plane, said door being free of projections inwardly of said plane and a continuous flexible rectangular metallic sealing frame secured to said car around said door opening, each of the sides of said rectangular sealing frame being of the same cross section, the marginal portions of said door having lateral engagement with said sealing strip in the closed position of said door.

21. In a car door, a latching mechanism carried by said door within the vertical margins thereof, said mechanism comprising a latching device, means including a lever for actuating said device and a sealing pin swingably secured to said door, said pin and said lever having cooperating shoulders whereby said pin maintains said lever against actuation.

22. In a car door, a latching mechanism carried by said door within the vertical margins thereof, said mechanism comprising a latching device, means including a lever for actuating said device and a sealing pin swingably secured to said door, said pin having a hook shaped portion automatically engaging a recess provided on said lever upon actuation of said lever to release said latch device for maintaining said lever and said latch device in inoperative position.

23. An all welded metallic car door adapted to be slidably mounted upon a railway house car side, comprising an integral unit marginal reinforcing frame, a plurality of vertically extending sheet metal panel sections, a member spanning the vertical joint between said sections and connected thereto, said member being welded to a single thickness of each of said sections upon the outside thereof, said marginal reinforcing frame being welded to said sections.

24. In a railway house car, a track having a vertically disposed inwardly directed flange serving as a tread and a horizontal flange extending laterally from said car, a lift door having frictional engagement with said track, means for elevating and supporting said door for sliding movement upon said car including flanged rollers mounted upon said tread, said door having a depending flange disposed between said tread and said car, said track carrying an inclined flange directed toward said car and positioned between said tread and said car, said depending door flange engaging said track flange in the lowering movement of said door, whereby said door is forced laterally toward said car side.

25. In a railway house car, a track having a vertically disposed inwardly directed flange serving as a tread and a horizontal flange extending laterally from said car, a lift door having frictional engagement with said track means for elevating and supporting said door for sliding movement upon said car, including flanged rollers mounted upon said tread, said door having a depending flange disposed between said tread and said car, said track carrying an inclined flange directed toward said car and positioned between said tread and said car, said depending door flange engaging said track flange in the lowering movement of said door, whereby said door is forced laterally toward said car side, and flexible metallic sealing means secured to said car around a door opening formed therein, said door being engaged with said sealing means by the lateral movement of said door.

KENNETH J. TOBIN.